(12) United States Patent
van Houtum (10) Patent No.: US 10,581,476 B2
(45) Date of Patent: Mar. 3, 2020

(54) BEAM FORMING FOR FIRST ADJACENT CANCELLATION

(71) Applicant: NXP B.V., Eindhoven (NL)

(72) Inventor: Wim van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/982,029

(22) Filed: May 17, 2018

(65) Prior Publication Data

US 2019/0356347 A1 Nov. 21, 2019

(51) Int. Cl.
*H04B 1/10* (2006.01)
*H04L 5/00* (2006.01)
(Continued)

(52) U.S. Cl.
CPC ......... *H04B 1/1036* (2013.01); *H04B 7/0617* (2013.01); *H04L 5/0073* (2013.01); *H04B 2001/1045* (2013.01); *H04W 72/082* (2013.01)

(58) Field of Classification Search
CPC .......... H04B 1/10; H04B 1/1027; H04B 1/12; H04B 1/123; H04L 27/2647
See application file for complete search history.

(56) References Cited

U.S. PATENT DOCUMENTS 6,018,317 A 1/2000 Dogan et al.
6,128,355 A 10/2000 Backman et al.
(Continued)

FOREIGN PATENT DOCUMENTS

WO 2005/060574 A2 7/2005
WO 2009/110899 A1 9/2009

OTHER PUBLICATIONS

Proakis et al,, "Digital Communications, Chapter Thirteen: Fading Channels: Characterization and Signaling," 5th-edition, ISBN-978-0-07-295716-7, pp. 851-855 (Nov. 6, 2007).

(Continued)

*Primary Examiner* — Shuwang Liu
*Assistant Examiner* — Gina M McKie
(74) *Attorney, Agent, or Firm* — Rajeev Madnawat (57) ABSTRACT

A communications device includes aspects for improving reception of transmissions with first-adjacent co-channel interference signals corresponding to digitally-modulated side-bands of in-band on-channel (IBOC) broadcasted signals. The communications device may include a radio frequency (RF) signal-reception circuit including two RF-signal paths driven in response to signals received via at least two respective antennas, and configured to respond to signals carried in the respective RF-signal paths by providing pre-processed RF output signals. The communications device may further include a beam-forming circuit driven in response to signals received at the at least two respective antennas and configured and arranged to facilitate first-adjacent interference cancellation (FAC). The communications device can also include an interference-cancelling circuit configured and arranged to reduce the first-adjacent co-channel interference signals by combining a beam-forming output signal provided by the beam-forming circuit with the pre-processed RF output signals as part of a maximum ratio combining (MRC) process.

19 Claims, 6 Drawing Sheets (51) Int. Cl.
*H04B 7/06* (2006.01)
*H04W 72/08* (2009.01)

(56) References Cited

U.S. PATENT DOCUMENTS

| | | | |
|---|---|---|---|
| 6,167,039 | A | 12/2000 | Karlsson et al. |
| 6,259,893 | B1 | 7/2001 | Kroeger et al. |
| 6,430,724 | B1 | 8/2002 | Laneman et al. |
| 6,532,258 | B1 * | 3/2003 | Goldston ............. H04B 17/336 370/514 |
| 6,671,340 | B1 | 12/2003 | Kroeger et al. |
| 9,106,472 | B1 | 8/2015 | Kroeger et al. |
| 9,749,033 | B2 | 8/2017 | Chang |
| 9,838,100 | B2 | 12/2017 | van Houtum |
| 10,014,893 | B2 | 7/2018 | van Houtum |
| 10,382,231 | B2 | 8/2019 | van Houtum |
| 2003/0053412 | A1 | 3/2003 | Yoshida et al. |
| 2003/0202568 | A1 | 10/2003 | Choi et al. |
| 2005/0135324 | A1 | 6/2005 | Kim et al. |
| 2007/0021085 | A1 | 1/2007 | Kroeger |
| 2008/0056343 | A1 | 3/2008 | Rajagopal et al. |
| 2009/0103593 | A1 | 4/2009 | Bergamo |
| 2010/0233988 | A1 | 9/2010 | Kon et al. |
| 2012/0033751 | A1 | 2/2012 | Sathananthan et al. |
| 2012/0033761 | A1 | 2/2012 | Guo et al. |
| 2012/0114031 | A1 | 5/2012 | Li et al. |
| 2012/0134435 | A1 | 5/2012 | Kapoor et al. |
| 2012/0189070 | A1 | 7/2012 | Kroeger |
| 2012/0212371 | A1 | 8/2012 | Chang |
| 2013/0115903 | A1 | 5/2013 | Kroeger et al. |
| 2013/0308717 | A1 | 11/2013 | Maltsev et al. |
| 2014/0056378 | A1 | 2/2014 | Harel et al. |
| 2014/0153625 | A1 | 6/2014 | Vojoic et al. |
| 2015/0303956 | A1 | 10/2015 | Kroeger et al. |
| 2015/0358040 | A1 * | 12/2015 | van Houtum ............ H04B 1/10 342/367 |
| 2016/0134337 | A1 | 5/2016 | Branlund |
| 2016/0142119 | A1 | 5/2016 | van Houtum |
| 2016/0142922 | A1 | 5/2016 | Chen et al. |
| 2016/0204810 | A1 | 7/2016 | Murrin |
| 2017/0214499 | A1 | 7/2017 | van Houtum |
| 2017/0331545 | A1 | 11/2017 | van Houtum et al. |
| 2018/0115342 | A1 * | 4/2018 | Doane ................... H01Q 3/247 |

OTHER PUBLICATIONS

National Radio Systems Committee (NRSC) NRSC-5-C, "In-band/on-channel Digital Radio Broadcasting Standard", Sep. 2011.
iBiquity Digital Corporation, HD Radio™ Air Interface Design Description Layer 1 FM, Doc.No.:SY_TN_1011sG Rev. G, Aug. 23, 2011.
Van Trees, "Optimum Array Processing," New York: Wiley-Interscience, 12 pgs (2002) (copy unavailable).

* cited by examiner

BEAM FORMING FOR FIRST ADJACENT CANCELLATION

OVERVIEW

Aspects of various embodiments are directed to communications systems in which beam forming is used for first adjacent cancellation. In digital radio broadcasts, signals are encoded in the digital domain, as opposed to traditional analog broadcasts that use amplitude modulated (AM) or frequency modulated (FM) techniques. The received and decoded digital audio signals have a number of advantages over their analog counterparts, such as a better sound quality.

Several digital radio broadcast systems that have been developed and deployed, including the in-band on-channel (IBOC) system which is discussed herein as one example. In IBOC systems, a digital signal is transmitted on both sides of an existing analog radio signal. IBOC radio transmission systems are generally used to transmit digital radio and analog radio broadcast signals simultaneously on the same frequency. There is also an all-digital version in which two digital signals are combined. The IBOC system multiplexes digital information by utilizing additional digital subcarriers or sidebands, thus avoiding re-allocation of broadcast bands. Such radio transmission systems are used to deliver digital audio and data services to mobile, portable, and fixed receivers from terrestrial transmitters on existing AM and FM radio broadcast channels. In hybrid mode, broadcasters may continue to transmit AM and FM analog signals simultaneously with the digital signals, allowing themselves and their listeners to convert from analog to digital radio while maintaining their current frequency allocations. Moreover, such systems accept as input compressed digital audio and utilize baseband signal processing techniques to increase the robustness of the signal in the transmission channel.

Such radio transmission systems provide many benefits, however, combining digital and analog radio broadcast signals simultaneously on the same frequency creates potential interference issues with adjacent channels. Particularly, the digital portion of the IBOC signal is subject to interference from the first adjacent analog signals. Reduction of first adjacent channel interference is hereafter referred to as first adjacent cancellation (FAC). While limiting the power of the IBOC digital signals may limit the interference with analog broadcast signals, the lower transmission power of IBOC signals can also limit the area over which the IBOC signals can be reliably received. These and other matters have presented challenges to efficiencies of improving reception of transmissions with IBOC broadcasted signal implementations, for a variety of applications.

SUMMARY

Various example embodiments are directed to issues such as those addressed above and/or others which may become apparent from the following disclosure concerning improving reception of transmissions with first-adjacent co-channel interference signals corresponding to digitally-modulated side-bands of in-band on-channel (IBOC) broadcasted signals. Example embodiments of the present disclosure include methods and apparatuses (e.g., devices and systems) for beam forming for first adjacent cancellation (BFFAC). In one example embodiment, BFFAC processing includes a combining process as well as a beam forming (BF) process to remove or at least significantly reduces first adjacent (FM)-interference signals and to combine, in an optimally Signal-to-Noise Ratio (SNR)-manner, the desired input-signals.

In accordance with example embodiments of the present disclosure, a communications device is directed to improving reception of transmissions with first-adjacent co-channel interference signals corresponding to digitally-modulated side-bands of in-band on-channel (IBOC) broadcasted signals. The communications device includes an RF signal-reception circuit including two RF-signal paths driven in response to signals received via at least two respective antennas and including respectively-associated front-end circuits including analog-to-digital converter and signal-processing circuitry configured to respond to signals carried in the respective RF-signal paths by providing pre-processed RF output signals. The communications device further includes a beam-forming circuit driven in response to signals received at the at least two respective antennas and configured and arranged in parallel with the two RF-signal paths of the RF signal-reception circuit to facilitate first-adjacent interference cancellation (FAC).

In some example embodiments, the beam-forming circuit is configured and arranged to facilitate FAC by providing a beam forming for first adjacent cancellation (BFFAC) signal as a function of the first-adjacent co-channel interference signals, using a statistically-based analysis to weight or assess a likelihood of the BFFAC signal indicating the first-adjacent co-channel interference signals are significant, and providing a beam-forming output signal in which weighting for noise-cancellation is provided for in response to the statistically-based analysis.

The communications device can further include an interference-cancelling circuit configured and arranged to reduce the first-adjacent co-channel interference signals by combining the beam-forming output signal with the pre-processed RF output signals as part of an MRC process and therein using the statistically-based analysis of the BFFAC signal to compensate for the first-adjacent co-channel interference.

In some example embodiments, the beam-forming circuit is configured and arranged to facilitate FAC by applying a log-likelihood ratio (LLR) analysis to weight or assess the likelihood of the BFFAC signal indicating the first-adjacent co-channel interference signals are significant. The beam-forming circuit may to compare the likelihood of the BFFAC signal indicating the first-adjacent co-channel interference signals are significant to a pre-stored threshold level of first-adjacent co-channel interference. The interference cancelling circuit may apply the MRC process responsive to a determination that the likelihood of the BFFAC signal indicating that the first-adjacent co-channel interference signals are less than the pre-stored threshold level of first-adjacent co-channel interference.

In other related example embodiments, the beam-forming circuit is configured and arranged to compare the likelihood of the BFFAC signal indicating the first-adjacent co-channel interference signals are significant to a pre-stored threshold level of first-adjacent co-channel interference, and the interference cancelling circuit is configured and arranged to apply a weighting process to the BFFAC signal based on the comparison. The likelihood of the BFFAC signal indicating the first-adjacent co-channel interference signals are significant may be represented by bit metrics, and the interference-cancelling circuit may be configured and arranged to reduce the first-adjacent co-channel interference signals by performing a weighted-addition of the bit metrics. Additionally and/or alternatively, the likelihood of the BFFAC signal indicating the first-adjacent co-channel interference signals are significant may be represented by sub-carrier metrics, and the interference-cancelling circuit may be configured and arranged to reduce the first-adjacent co-channel interference signals by performing a weighted-addition of the sub-carrier metrics.

In accordance with yet other aspects of the present disclosure, a method for improving reception of transmissions with first-adjacent co-channel interference signals corresponding to digitally-modulated side-bands of in-band on-channel (IBOC) broadcasted signals is provided. The method includes generating at least two RF-signal paths in response to signals received via at least two respective antennas, and providing pre-processed RF output signals for each of the at least two RF-signal paths using respectively-associated front-end circuits including analog-to-digital converter and signal-processing circuitry.

The method can include facilitating first-adjacent interference cancellation (FAC) in response to signals received at the at least two respective antennas, and reducing the first-adjacent co-channel interference signals by combining the beam-forming output signal with the pre-processed RF output signals as part of an maximum ratio combining (MRC) process and therein using the statistically-based analysis of the BFFAC signal to compensate for the first-adjacent co-channel interference. The method includes facilitating FAC by providing a beam forming for first adjacent cancellation (BFFAC) signal as a function of the first-adjacent co-channel interference signals, using a statistically-based analysis to weight or assess a likelihood of the BFFAC signal indicating the first-adjacent co-channel interference signals are significant, and providing a beam-forming output signal in which weighting for noise-cancellation is provided for in response to the statistically-based analysis.

In yet further example embodiments, the method can include combining the pre-processed RF output signals and the BFFAC signal responsive to application of the statistically-based analysis to each of the pre-processed RF output signals and the BFFAC signal, and applying an MRC process to the combined signals. Additionally and/or alternatively, such method can include combining the pre-processed RF output signals and the BFFAC signal, applying the MRC process to the combined signal, and applying the statistically-based analysis to the combined signal responsive to application of the MRC process. In such example embodiments, the likelihood of the BFFAC signal indicating the first-adjacent co-channel interference signals are significant is represented by bit metrics, and applying the MRC process to the combined signal includes performing a weighted-addition of the bit metrics.

In some example embodiments, the likelihood of the BFFAC signal indicating the first-adjacent co-channel interference signals are significant is represented by sub-carrier metrics, and wherein the MRC process is applied in a manner proportional to the sub-carrier metrics. Additionally and/or alternatively, providing pre-processed RF output signals may include applying a fast Fourier transform (FFT) process to each of the RF-signal paths, and applying the FFT process to the BFFAC signal prior to application of the MRC process.

The method may further include comparing the likelihood of the BFFAC signal indicating the first-adjacent co-channel interference signals are significant to a pre-stored threshold level of first-adjacent co-channel interference, and applying an MRC process responsive to a determination that the likelihood of the BFFAC signal indicating that the first-adjacent co-channel interference signals are less than the pre-stored threshold level of first-adjacent co-channel interference. Additionally and/or alternatively, the method may include comparing the likelihood of the BFFAC signal indicating the first-adjacent co-channel interference signals are significant to a pre-stored threshold level of first-adjacent co-channel interference, and applying a weighting process to the BFFAC signal based on the comparison.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods for improving reception of transmissions with first-adjacent co-channel interference signals. In certain implementations, aspects of the present disclosure have been shown to be beneficial when used in the context of IBOC radio transmission systems which is used herein as a non-limiting example system since it is used to transmit digital radio and analogue radio broadcast signals simultaneously on the same frequency.

Example embodiments of the present disclosure relate to the processing of an orthogonal frequency multiplexing (OFDM)-signal comprising a central-part centered on a carrier frequency, a lower sideband below the lowest frequency of the central-part and an upper-sideband above the highest frequency of the central-part. Particularly, example embodiments of the present disclosure are directed to an IBOC radio transmission system that is used to transmit digital radio and analogue radio broadcast signals simultaneously on the same frequency. Additional example embodiments of the present disclosure are directed to an all-digital version in which two digital signals are combined. The term (H)IBOC, as used herein, refers to or includes an IBOC signal which can be in hybrid or in all digital form.

According to exemplary aspects of the instant disclosure, reception improvement of transmitted (H)IBOC-signals may be obtained with electronically steered antennae radiation-patterns of multiple-antennae, e.g., a Uniform-Linear-Array (ULA) consisting of two isotropic antennae. The radiation-patterns of the antennae may be steered by using complex base-band signals with phase and amplitude-estimations in a process referred to as electronically-steered complex base-band beam forming. This type of beam forming also enables null-steering to suppress or remove interference signals, and enables the First Adjacent (interference) Cancellation (FAC). For improved reception of (H)IBOC-signals within a multiple-antennae scenario, in some embodiments a MRC procedure may be used, in which the received-power of each antenna is controlled in such a way that it is constructively added. As the first adjacent (FM)-interference signals are co-channel interference signals for the digitally-modulated side-bands of a (H)IBOC-transmission. Some example methods for reception improvement of (H)IBOC-signals, are discussed in more detail in U.S. Pat. No. 9,838,100, titled Beam Forming With Double-Null-Steering For In-Band On-Channel Reception, U.S. patent application Ser. No. 15/590,421, titled A Receiver Circuit, and U.S. patent application Ser. No. 15/649,986, titled A Receiver Circuit, which are fully incorporated by reference herein generally for aspects related to reception improvement of (H)IBOC-signals, and specifically for aspects related to suppression of FAC signals, BF with suppression capabilities, and BF as used with MRC, respectively.

The performance of MRC is limited by the fact that a receiving-antenna receives stronger electromagnetic waves in some directions than in others, i.e., it is a non-ideal omni-directional antenna. Also, MRC is also not capable of controlled suppression of undesired-signals, though electronically steered beam forming or phase-diversity processes do not suffer from these limitations. In accordance with specific example embodiments of the present disclosure, a device and/or system applies a beam forming methodology for its nulling capabilities to remove FAC signals as an extra path to an MRC device for its combining-capabilities. Example embodiments of the present disclosure include an (H)IBOC receiver with MRC processing that weighs also the BFFAC-path in its outcome.

Example embodiments of the present disclosure are directed to BFFAC with (H)IBOC FM-reception, including a MRC process and a BF process. The BF process removes or at least significantly reduces first adjacent (FM)-interference signals and the MRC-process combines, in an optimally Signal-to-Noise Ratio (SNR)-manner, the desired input-signals. Within the BFFAC-procedure, the BF-process output is the FAC-signal that fits as an extra input-stream, besides the MRC input-streams, to the MRC-process. The BF output-signal stream as well as the MRC input streams are fed into the MRC-process for combining the BF signal and the MRC input-signals in an optimal-way (e.g., improved) in the sense of Signal-to-Interference+Noise Ratio (SINR).

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In accordance with example embodiments of the present disclosure, a communications device (e.g., circuit) is configured for improving reception of transmissions with first-adjacent co-channel interference signals corresponding to digitally-modulated side-bands of IBOC broadcasted signals. The communications device includes a radio frequency (RF) signal-reception circuit including two RF-signal paths driven in response to signals received via at least two respective antennas and including respectively-associated front-end circuits including analog-to-digital converter and signal-processing circuitry configured to respond to signals carried in the respective RF-signal paths by providing pre-processed RF output signals. The communications device further includes a beam-forming circuit driven in response to signals received at the at least two respective antennas and configured and arranged in parallel with the two RF-signal paths of the RF signal-reception circuit to facilitate FAC. In some example embodiments, the beam-forming circuit is configured and arranged to facilitate FAC by providing a BFFAC signal as a function of the first-adjacent co-channel interference signals, using a statistically-based analysis to weight or assess a likelihood of the BFFAC signal indicating the first-adjacent co-channel interference signals are significant, and providing a beam-forming output signal in which weighting for noise-cancellation is provided for in response to the statistically-based analysis.

The communications device can further include an interference-cancelling circuit configured and arranged to reduce the first-adjacent co-channel interference signals by combining the beam-forming output signal with the pre-processed RF output signals as part of an MRC process and therein using the statistically-based analysis of the BFFAC signal to compensate for the first-adjacent co-channel interference.

In some example embodiments, the above-characterized type of beam-forming circuit is configured and arranged to facilitate FAC by applying a log-likelihood ratio (LLR) analysis to weight or assess the likelihood of the BFFAC signal indicating the first-adjacent co-channel interference signals are significant. The beam-forming circuit may to compare the likelihood of the BFFAC signal indicating the first-adjacent co-channel interference signals are significant to a pre-stored threshold level of first-adjacent co-channel interference. The interference cancelling circuit may apply the MRC process responsive to a determination that the likelihood of the BFFAC signal indicating that the first-adjacent co-channel interference signals are less than the pre-stored threshold level of first-adjacent co-channel interference. In some specific example embodiments, the beam-forming circuit is configured and arranged to compare the likelihood of the BFFAC signal indicating the first-adjacent co-channel interference signals are significant to a pre-stored threshold level of first-adjacent co-channel interference, and the interference cancelling circuit is configured and arranged to apply a weighting process to the BFFAC signal based on the comparison. The likelihood of the BFFAC signal indicating the first-adjacent co-channel interference signals are significant may be represented by bit metrics, and the interference-cancelling circuit may be configured and arranged to reduce the first-adjacent co-channel interference signals by performing a weighted-addition of the bit metrics. Additionally and/or alternatively, the likelihood of the BFFAC signal indicating the first-adjacent co-channel interference signals are significant may be represented by sub-carrier metrics, and the interference-cancelling circuit may be configured and arranged to reduce the first-adjacent co-channel interference signals by performing a weighted-addition of the sub-carrier metrics.

In accordance with certain example embodiments of the present disclosure, methods are directed to improving reception of transmissions with first-adjacent co-channel interference signals corresponding to digitally-modulated sidebands of IBOC broadcasted signals. Such methods can include generating at least two RF-signal paths in response to signals received via at least two respective antennas, and providing pre-processed RF output signals for each of the at least two RF-signal paths using respectively-associated front-end circuits including analog-to-digital converter and signal-processing circuitry. One such method includes facilitating FAC in response to signals received at the at least two respective antennas, and reducing the first-adjacent co-channel interference signals by combining the beam-forming output signal with the pre-processed RF output signals as part of an MRC process and therein using the statistically-based analysis of the BFFAC signal to compensate for the first-adjacent co-channel interference. This approach can facilitate FAC by providing a BFFAC signal as a function of the first-adjacent co-channel interference signals, using a statistically-based analysis to weight or assess a likelihood of the BFFAC signal indicating the first-adjacent co-channel interference signals are significant, and providing a beam-forming output signal in which weighting for noise-cancellation is provided for in response to the statistically-based analysis.

In some example embodiments, the methods can include combining the pre-processed RF output signals and the BFFAC signal responsive to application of the statistically-based analysis to each of the pre-processed RF output signals and the BFFAC signal, and applying the MRC process to the combined signals. Additionally and/or alternatively, the method includes combining the pre-processed RF output signals and the BFFAC signal, applying the MRC process to the combined signal, and applying the statistically-based analysis to the combined signal responsive to application of the MRC process. In such example embodiments, the likelihood of the BFFAC signal indicating the first-adjacent co-channel interference signals are significant is represented by bit metrics, and applying the MRC process to the combined signal includes performing a weighted-addition of the bit metrics. In some example embodiments, the likelihood of the BFFAC signal indicating the first-adjacent co-channel interference signals are significant is represented by sub-carrier metrics, and wherein the MRC process is applied in a manner proportional to the sub-carrier metrics. Additionally and/or alternatively, providing pre-processed RF output signals may include applying a fast Fourier transform (FFT) process to each of the RF-signal paths, and applying the FFT process to the BFFAC signal prior to application of the MRC process.

The methods may further include comparing the likelihood of the BFFAC signal indicating the first-adjacent co-channel interference signals are significant to a pre-stored threshold level of first-adjacent co-channel interference, and applying the MRC process responsive to a determination that the likelihood of the BFFAC signal indicating that the first-adjacent co-channel interference signals are less than the pre-stored threshold level of first-adjacent co-channel interference. Additionally and/or alternatively, the methods may include comparing the likelihood of the BFFAC signal indicating the first-adjacent co-channel interference signals are significant to a pre-stored threshold level of first-adjacent co-channel interference, and applying a weighting process to the BFFAC signal based on the comparison.

An IBOC digital radio broadcasting standard for the FM-band is described and exemplified by the FM-part of the "In-band/on-channel Digital Radio Broadcasting Standard" document published by National Radio Systems Committee (NRSC). This document is also the basis for the transmitted IBOC-signals that can be received by an HD Radio™ certified receiver. The HD Radio™ transmissions are also based on "HD Radio™ Air Interface Design Description Layer 1 FM", Doc. No.: SY_IDD_1011sG Rev. G, Aug. 23, 2011.

Figure 1:
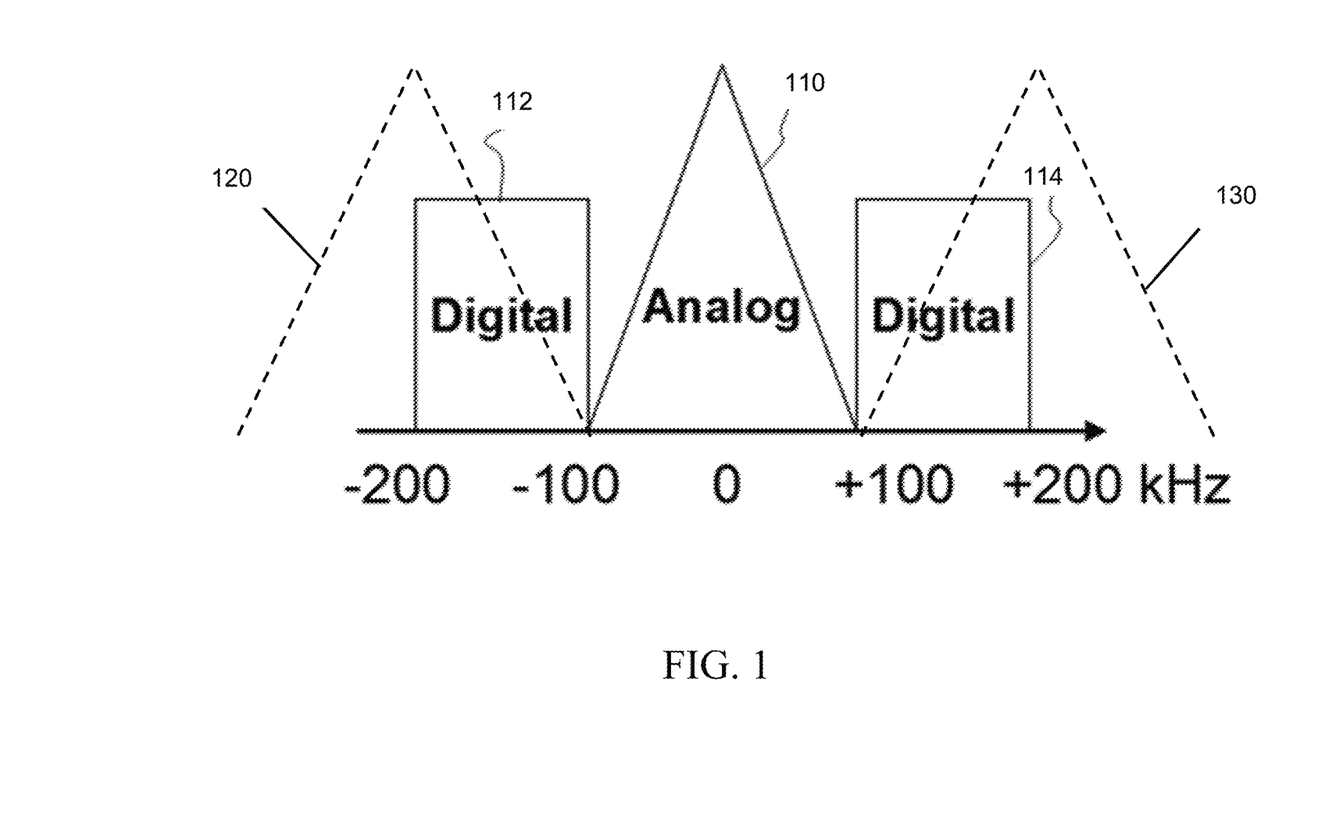
FIG. 1 illustrates a simplified form of one type of IBOC signal, in accordance with the present disclosure.

FIG. 1 illustrates a simplified form of one type of IBOC signal, in accordance with the present disclosure. Particularly, FIG. 1 illustrates an example "Hybrid IBOC FM" signal, which is denoted "(H)IBOC" herein. Frequency is shown on the horizontal axis, with 0 Hz representing the carrier frequency. The vertical dimension of FIG. 1 represents power. The hybrid signal illustrated in FIG. 1 is a combination/addition of an analogue FM-signal 110 and a digitally-modulated signal 112, 114. The analogue FM-signal 110 occupies a bandwidth of 200 kHz, which is between −100 kHz and 100 kHz, and represents a central-part that is centered on the carrier frequency. The digitally-modulated signal 112, 114 occupies a bandwidth of roughly 200 kHz. However, the digitally-modulated signal is separated into a lower-sideband 112 and an upper-sideband 114, each with a bandwidth of roughly 100 kHz. The lower-sideband is spectrally positioned at a distance of 100 kHz below the carrier-frequency. The upper-sideband 114 is spectrally positioned at a distance of 100 kHz above the carrier-frequency. In this way, the lower-sideband 112 is below the lowest frequency of the central-part, and the upper-sideband 114 is above the highest frequency of the central-part. The digitally-modulated signal 112, 114 can use orthogonal frequency division multiplexing (OFDM), where the number of subcarriers can vary depending on the selected service/transmission-mode.

In accordance with certain embodiments of the present disclosure, a so-called "channel-grid" defines a reserved channel-bandwidth for an analogue FM-signal. The channel bandwidth in Band-II is 200 kHz by regulation, as shown by the analogue FM-signal 110 in FIG. 1. As a consequence, the lower and upper digital OFDM-sidebands 112, 114 can correspond to the frequency range of first adjacent lower and upper neighboring FM-channels. FIG. 1 also shows a first adjacent lower neighboring FM-channel 120, and a first adjacent upper neighboring FM-channel 130. The primary sidebands 112, 114 of the (H)IBOC signal occupy roughly 100 kHz of the lower neighboring channel 120 and roughly 100 kHz of the upper neighboring channel 130. Due to the fact that the primary sidebands 112, 114 are outside this 200 kHz grid, they are susceptible to interference by the neighboring channels, that is first adjacent (FM)-interference. Thus, each first adjacent (FM)-signal 120, 130 of a (H)IBOC-transmission can introduce co-channel interference for the digitally modulated lower- and upper-sidebands 112, 114. The co-channel interference, by regulation, can be up to a factor of a hundred stronger in power than the digitally-modulated lower- and upper-sidebands 112, 114. Moreover, both of the first adjacent interference signals 120, 130 can be present at the same time, thus the lower- and upper-sidebands 112, 114 are in this case both distorted by a neighboring FM-transmission.

Figure 2:
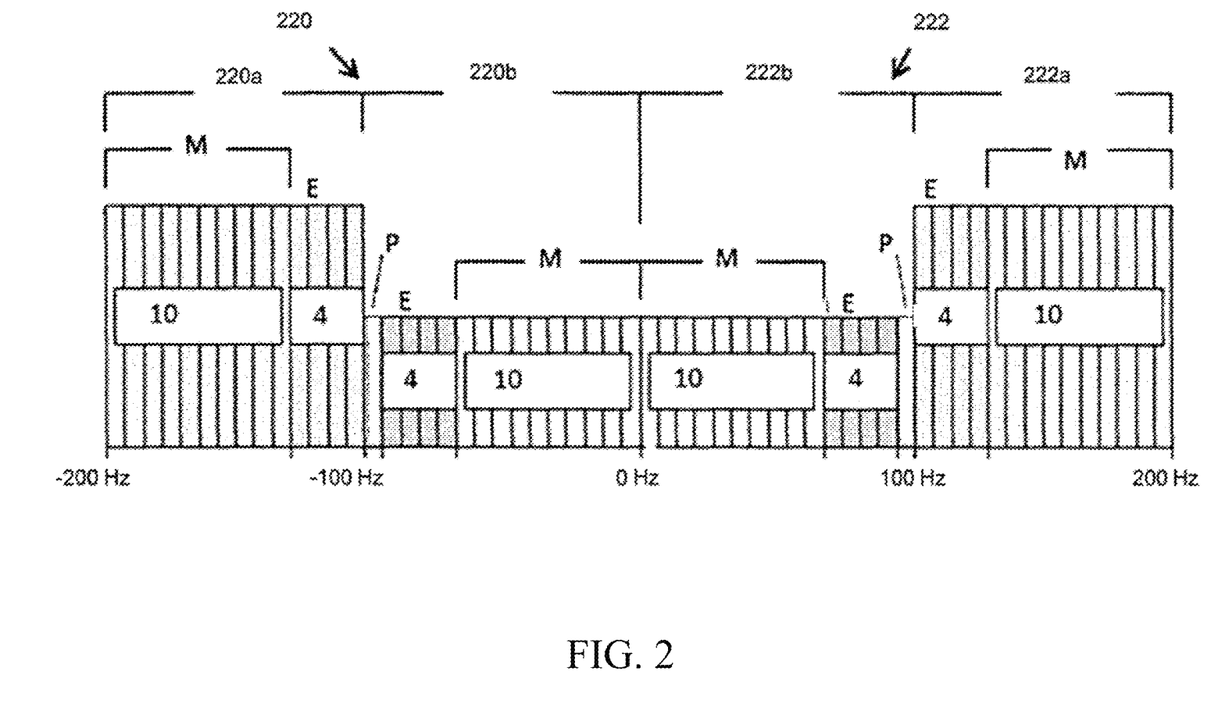
FIG. 2 illustrates a spectrum plot of an all-digital implementation of an IBOC signal, in accordance with the present disclosure.

FIG. 2 illustrates a spectrum plot of an all-digital implementation of an IBOC signal, in accordance with the present disclosure. For the all-digital IBOC FM signal in such embodiments, the analogue FM-signal is replaced by a (secondary) digitally-modulated signal 220b, 222b. In the all-digital mode, the bandwidth of the primary digital sidebands 220a, 222a is fully expanded with lower-power secondary sidebands. The all-digital IBOC signal in this context has a bandwidth of roughly 400 kHz. Approximately 100 kHz of each of the lower and upper adjacent channels is occupied (that is, the frequencies that are outside the 200 kHz "channel-grid"). The lower digital sideband of the all-digital IBOC signal is shown as 220 and the upper digital sideband is shown as 222. Each has a primary section 220a, 222a and a secondary section 220b, 222b. In FIG. 2, the number of extended frequency partitions (E) is fixed to 4. In a hybrid-mode system, for example as shown in FIG. 1, the number of extended frequency partitions (E) can be; 0, 1, 2, or 4, depending on the transmitted service mode.

Figure 3:
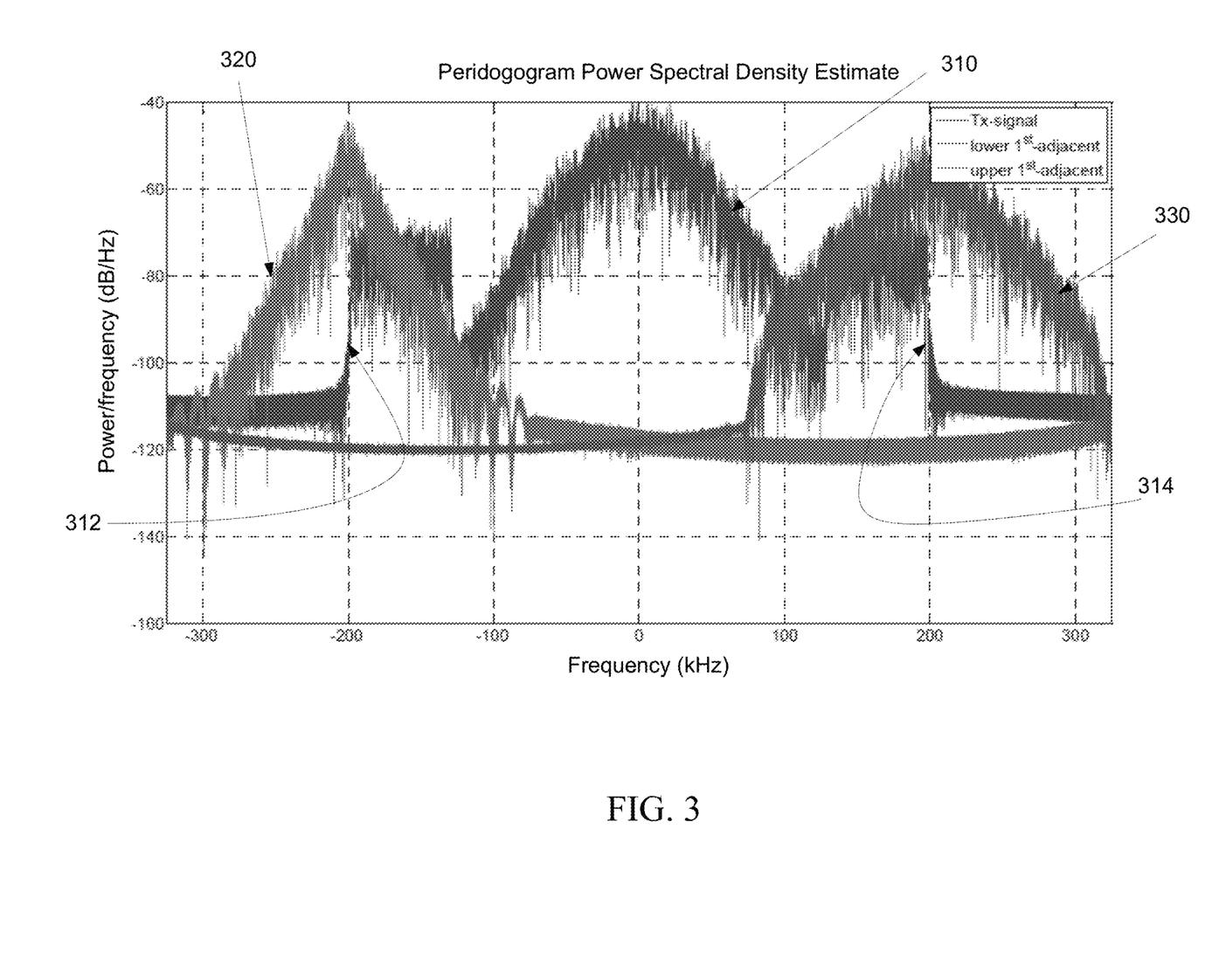
FIG. 3 illustrates a periodogram power spectral density (PSD) estimate of a (H)IBOC-transmission with lower and upper first-adjacent (FM)-interference signals, in accordance with the present disclosure.

FIG. 3 illustrates a periodogram power spectral density (PSD) estimate of a (H)IBOC-transmission with lower and upper first-adjacent (FM)-interference signals, in accordance with specific embodiments of the present disclosure. Various portions of the signals in FIG. 3 have been given the same reference numbers as the corresponding portions of the signals shown in FIG. 1. FIG. 3 shows that indeed the lower- and upper-sidebands 312, 314 of the (H)IBOC transmission 310 (black-curve) are heavily distorted by the lower first-adjacent neighbor FM-transmission 320 (light-grey curve) and the upper first-adjacent neighbor FM-transmission (dark-grey curve) 330, respectively.

Figure 4:
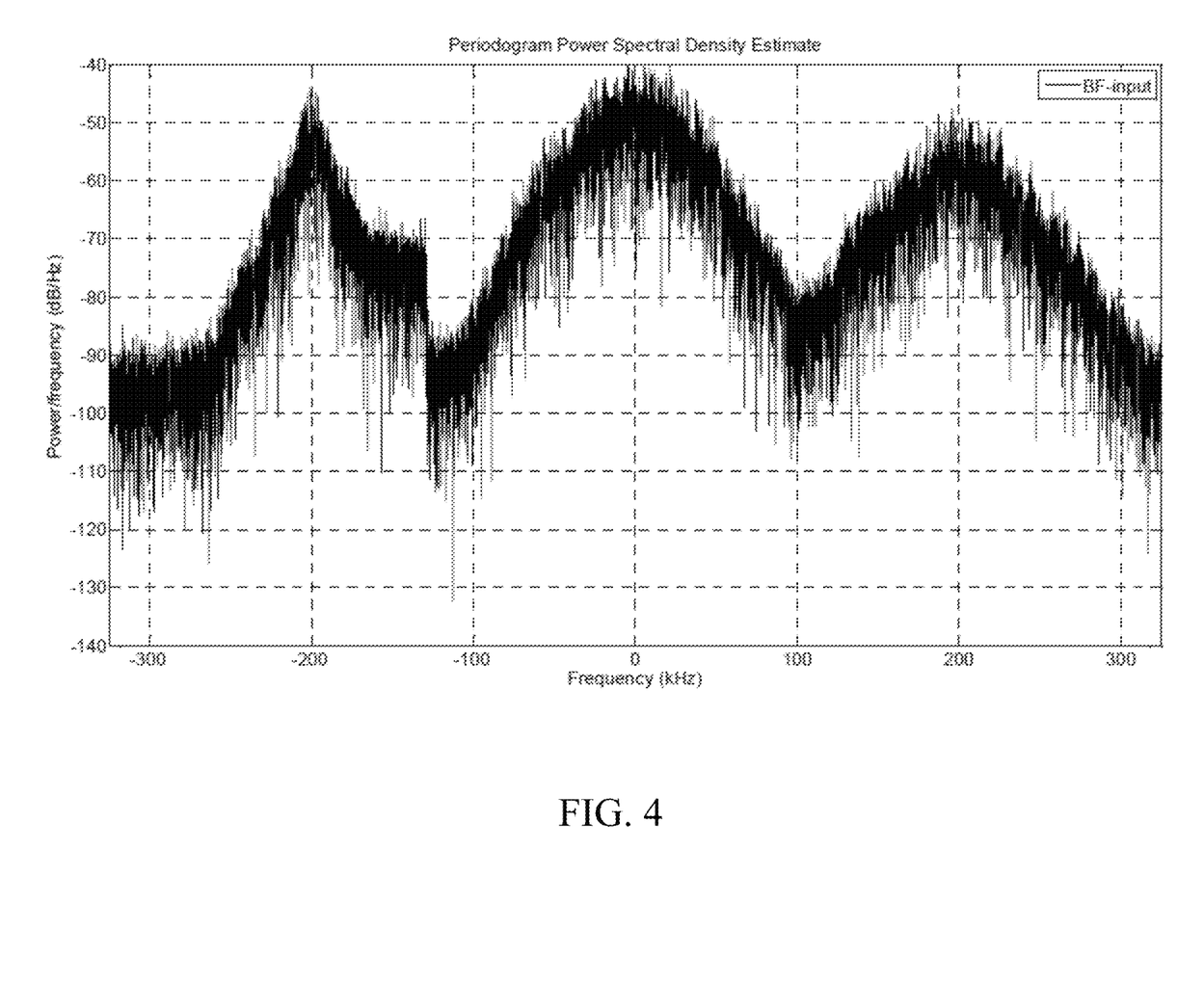
FIG. 4 illustrates an example input-signal for a beam forming process, in accordance with the present disclosure.

FIG. 4 illustrates an example input-signal for a beam forming process, in accordance with specific embodiments of the present disclosure. The input signal is the summation of the (H)IBOC-transmission and the two first adjacent FM-transmissions of FIG. 3. The base-band of the received radio signal occupies a bandwidth of roughly 600 kHz, i.e., between −300 kHz and 300 kHz. The received-signal includes the desired (H)IBOC-signal, which occupies roughly 400 kHz between −200 kHz and 200 kHz. Note that the received-signal, i.e., the input-signal of the beam former, can include zero, one or two first adjacent (FM)-interference signals. The first adjacent (FM)-interference signals occupy roughly 200 kHz, where the lower first adjacent (FM)-interference-signal is between −300 kHz and −100 kHz, and the upper first adjacent (FM)−interference-signal is between 100 kHz and 300 kHz. The output-signal of the beam forming procedure, i.e., the BFFAC-signal, is applied as input-signal to the MRC-procedure, as discussed further herein.

Figure 5:
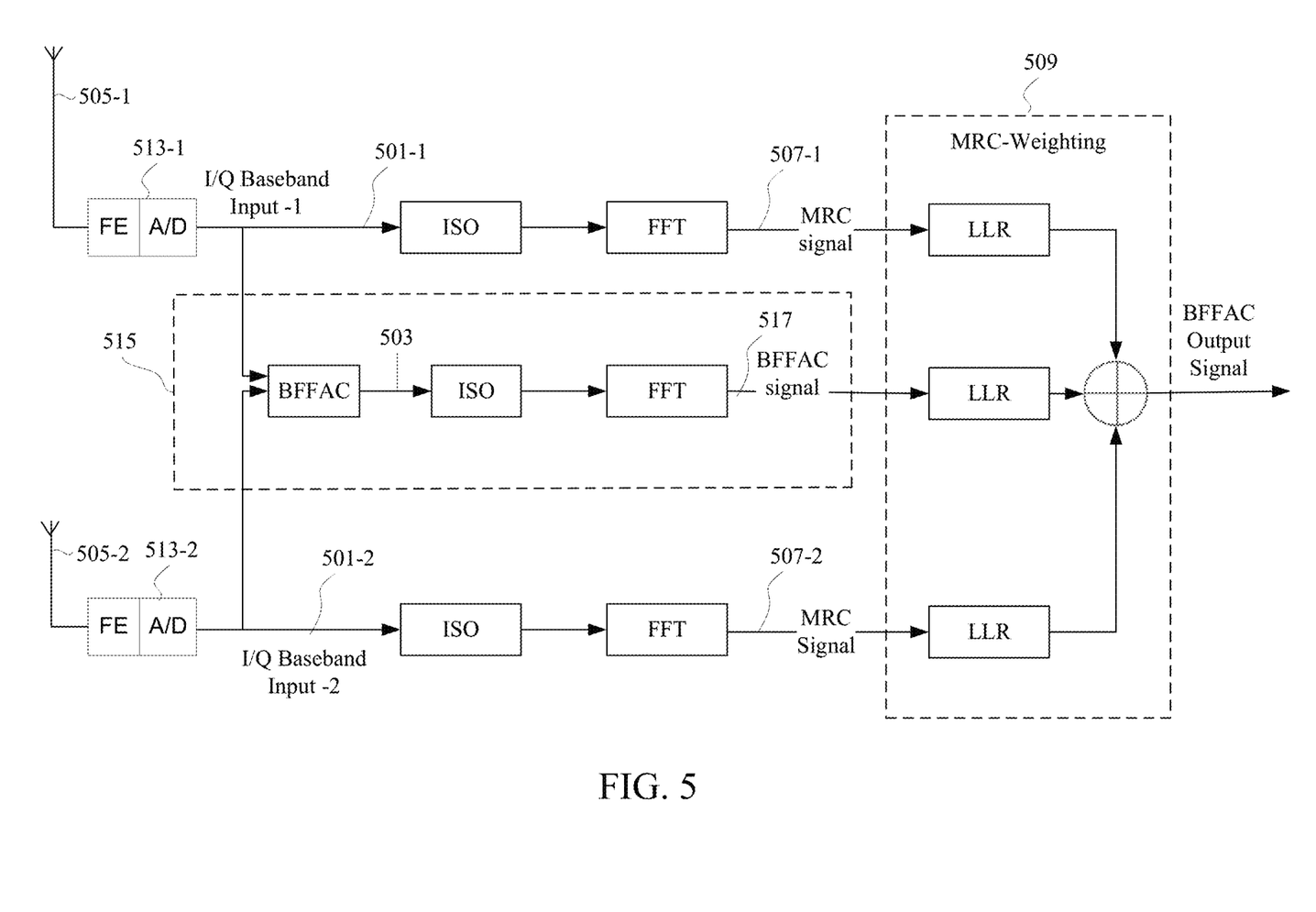
FIG. 5 illustrates an example communications device for improving reception of transmissions with FAC interference signals, according to the present disclosure.

FIG. 5 illustrates an example communications device for improving reception of transmissions with FAC interference signals, according to certain aspects of the present disclosure. FIG. 5 illustrates a specific example circuit including an (H)IBOC receiver with MRC processing that weights a BFFAC signal in its outcome based on bit-metrics (e.g., Log-Likelihood Ratios (LLRs)). The reception of transmitted (H)IBOC-signals is improved by an ULA consisting of two isotropic antennae (505-1, 505-2) and BF with suppression capabilities as an extra path of the MRC weighting, referred to herein as the BFFAC procedure. This BFFAC procedure might be quite optimal because MRC is optimal, in Signal-to-Noise Ratio (SNR)-sense, in weighing signals and combining them. The MRC weights are proportional to the SNR-quality of the signals and can be, for example, expressed in terms of bit-metrics of the signals as shown in FIG. 5. These bit-metrics of the input-signals may be added, for example, as a weight-addition, to maximize the SNR.

Figure 6:
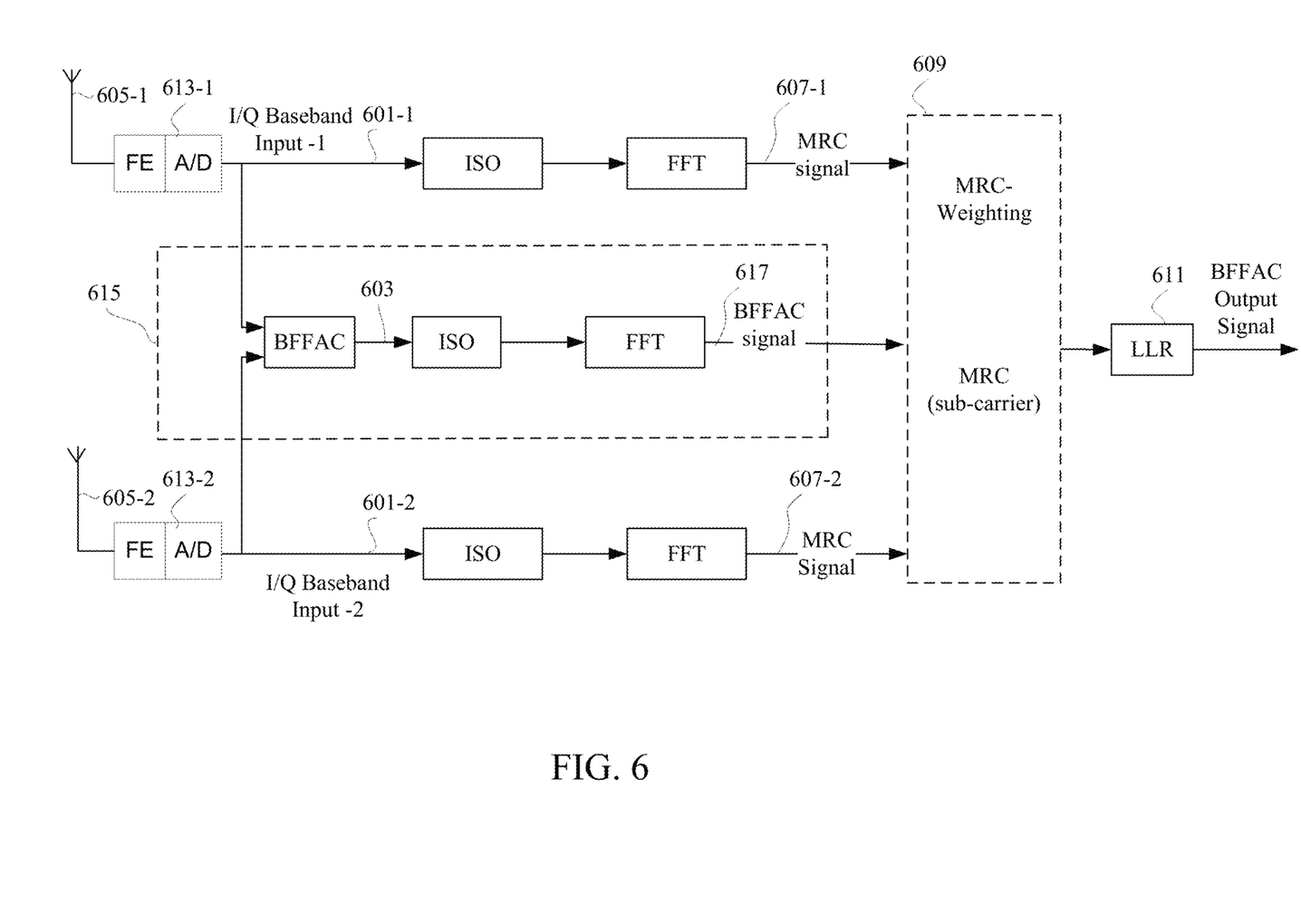
FIG. 6 further illustrates an example communications device for improving reception of transmissions with FAC interference signals, according to the present disclosure.

Such electronically-steered BF with suppression capabilities eliminate or at least suppress (i.e., mitigates) the interference-signals for the output this signal. The applied suppression does not need to use either prevention-of-self-nulling or prevention-of-unnecessary-suppression, since the quality of the BFFAC-signal is reflected, for example, by bit-metrics (as illustrated in FIG. 5), and/or sub-carrier-metrics (as illustrated in FIG. 6). The BFFAC signal 517 is an extra input-signal for the MRC-procedure. Hence, the MRC-procedure combines the BFFAC signal 517 and MRC-signals 507-1 and 507-2 in an optimal way in SNR-sense. Consequently, BFFAC optimizes (e.g., significantly improves) SINR in (H)IBOC-transmissions. The combination of an MRC-procedure and the electronically steered BF is able to remove or significantly reduce both first adjacent interference signals by double-null-steering, and also capable of combining the desired (H)IBOC-signal, i.e., the BFFAC-system or BFFAC-procedure. In these contexts, significant refers to a change of at least ten percent. The interference-suppression is accomplished with an ULA consisting of two isotopic-elements 505-1, 505-2, spaced by half the wavelength of the carrier-frequency, e.g., $f_c$=100 MHz→$\lambda$≈3 m for transmissions within the FM-band.

As illustrated in FIG. 5, the communications device includes an RF signal-reception circuit including two RF-signal paths 501-1 and 501-2, driven in response to signals received via at least two respective antennas 505-1 and 505-2 and including respectively-associated front-end circuits (513-1 and 513-2) including analog-to-digital converter and signal-processing circuitry configured to respond to signals carried in the respective RF-signal paths by providing pre-processed RF output signals 507-1, 507-2. The communications device further includes a beam-forming circuit 515 driven in response to signals received at the at least two respective antennas 505-1 and 505-2, and configured and arranged in parallel with the two RF-signal paths 501-1 and 501-2 of the RF signal-reception circuit to facilitate FAC. The beam forming circuit 515 is configured and arranged to facilitate FAC by providing a BFFAC signal 503 as a function of the first-adjacent co-channel interference signals, using a statistically-based analysis to weight or assess a likelihood of the BFFAC signal indicating the first-adjacent co-channel interference signals are significant, and providing a beam-forming output signal 517 in which weighting for noise-cancellation is provided for in response to the statistically-based analysis.

The communications device can further include an interference-cancelling circuit 509 configured and arranged to reduce the first-adjacent co-channel interference signals by combining the beam-forming output signal 517 with the pre-processed RF output signals 507-1, 507-2, as part of a MRC process and therein using the statistically-based analysis of the BFFAC signal to compensate for the first-adjacent co-channel interference. While LLR is discussed and illustrated as an example statistically-based analysis, example embodiments are not so limited, and additional and/or different statistical analyses other than LLR may be performed.

Reception improvement of transmitted (H)IBOC-signals can be obtained with electronically steered antennae radiation-patterns of a multiple (two)-antennae, e.g., a Uniform-Linear-(antennae)-Array (ULA) consisting of two isotropic antennae (e.g., 505-1, 505-2). Beamforming also enables "null-steering" to suppress (or remove) interference signals. For example, it can enable the suppression of first adjacent (FM)-interference signals for a (H)IBOC-transmission (in the hybrid-mode as well as in the all-digital mode). Moreover, this type of beamforming enables the so called co-channel-interference cancellation (CIC) since the first adjacent (FM)-interference signals are co-channel interference signals for the digitally-modulated side-bands of a (H)IBOC-transmission. However, the suppression of the first adjacent interference-signals can also lead to suppression of the received desired-signal if there is not enough spatial-separation between the interference-signal and the desired-signal, which is referred to as "self-nulling".

A beam forming process has the objective to remove, or at least reduce, both the first adjacent interference signals with the usage of multiple antennae, in some example embodiments only two antennae for reasons of low complexity and costs. Note, that MRC is not necessarily capable of removing or reducing the co-channel interference caused by the first adjacent (FM)-interference signals, since MRC optimally combines the total signal-energy, i.e., including the first adjacent signal-energy.

In accordance with other aspects of the present disclosure, the space-domain is exploited by a beam forming approach to remove/lessen the first adjacent (FM)-interference signals. Subsequently, an electronically-steered complex base-band beam forming algorithm may be used to separate the three different signals by their spatially different information ("spatial-signature").

The input-signal of the BFFAC-procedure (e.g., the BF plus the MRC-procedure) might be contaminated with first adjacent interference-signals and this could be efficiently-suppressed by the BF process and efficiently combined by the MRC-process. In this case it might be appropriate to apply the optimal-weights based on suppression on the interference-signal at the lower frequency-bin, or on the interference-signal at the upper frequency-bin, or on the interference-signals at both bins, resulting in the BFFAC-signal as the output-signal.

Accordingly, the output-signal of the beam forming procedure, i.e., the BFFAC signal 517, can be applied as an input signal to the MRC procedure. The MRC procedure performs a quality-weighing addition of the BFFAC signal 517 with the MRC input-signals, 507-1, 507-2. Thus, for the BFFAC procedure, the following-scenarios might be of interest. First, if there are no interference-signals, the BFFAC-signal-quality might be similar than the conventional MRC input-signal-quality, e.g., in bit-metric sense, by applying appropriate (H)IBOC-receiver-processing. Second, if there are interference-signals without lack-of-spatial information, then the BFFAC-signal quality might be higher than the MRC input-signal-quality, e.g., in bit-metric sense, by applying appropriate (H)IBOC-receiver-processing. Third, if there are interference-signals with lack-of-spatial information, then the BFFAC-signal quality might be lower than the MRC input-signal-quality, e.g., in bit-metric sense, by applying appropriate ((H)IBOC-receiver)-processing and the MRC-procedure can perform an "weighted-addition of the bit-metrics" accordingly. Hence, the BFFAC-procedure can optimize/improve the SINR by letting the beam forming procedure provide a suppressed signal as one MRC input-signal and, in addition, the conventional MRC input-signals are also still available/provided for optimal combining (coherently addition) and then using the MRC procedure to weight the BFFAC-signal and the conventional MRC-signals optimally in the sense of SNR, as shown by FIG. 5.

The beam-forming circuit 515 may be configured and arranged to apply a log-likelihood ratio analysis (e.g., LLR in the example illustrated in FIG. 5) to weight or assess the likelihood of the BFFAC signal indicating the first-adjacent co-channel interference signals are significant. In some example embodiments, the beam-forming circuit 515 is configured and arranged to compare the likelihood of the BFFAC signal 517 indicating the first-adjacent co-channel interference signals are significant to a pre-stored threshold level of first-adjacent co-channel interference. Moreover, the interference-cancelling circuit 509 may be is configured and arranged to apply the MRC process responsive to a determination that the likelihood of the BFFAC signal 517 indicating that the first-adjacent co-channel interference signals are less than the pre-stored threshold level of first-adjacent co-channel interference.

In some example embodiments, the interference-cancelling circuit 509 may be configured and arranged to apply a weighting process to the BFFAC signal 517 based on the comparison. The likelihood of the BFFAC signal 517 indicating the first-adjacent co-channel interference signals are significant may be represented in various forms such as by bit metrics, and the interference-cancelling circuit 509 may be configured and arranged to reduce the first-adjacent co-channel interference signals by performing a weighted-addition of the bit metrics.

As illustrated in FIG. 5, a statistically-based analysis may be used to weight each of the respective signals prior to weighting by the interference-cancelling circuit 509. The statistically-based analysis may be applied to each of the MRC signals 507-1 and 507-2, as well as the BFFAC signal 517, prior to combining by the interference-cancelling circuit 509 during the MRC process. Accordingly, the interference-cancelling circuit 509 may also include a combiner that adds or otherwise combines together the bit-metrics of the MRC signals (507-1 and 507-2), and the bit-metrics of the BFFAC signal 517, and provides a BFFAC output-signal. By combining together the bit-metrics in this way, they are maximum-ratio combined such that the received-power of each antenna 505-1 and 505-2 is controlled in such a way that it is constructively (coherently) added.

FIG. 6 further illustrates an example communications device for improving reception of transmissions with FAC interference signals, according to the present disclosure. Particularly, FIG. 5 illustrates an example circuit including an (H)IBOC receiver with MRC processing that weights a BFFAC signal in its outcome based on sub-carrier metrics. As illustrated in FIG. 6, the communications device includes an RF signal-reception circuit including two RF-signal paths 601-1 and 601-2, driven in response to signals received via at least two respective antennas 605-1 and 605-2, and including respectively-associated front-end circuits 613-1 and 613-2, including analog-to-digital converter and signal-processing circuitry configured to respond to signals carried in the respective RF-signal paths by providing pre-processed RF output signals 607-1 and 607-2. The communications device includes a beam-forming circuit 615 driven in response to signals received at the at least two respective antennas 605-1 and 605-2 and configured and arranged in parallel with the two RF-signal paths 601-1 and 601-2 of the RF signal-reception circuit to facilitate FAC. The beam-forming circuit 615 may facilitate FAC by providing a BFFAC signal 603 as a function of the first-adjacent co-channel interference signals, using a statistically-based analysis to weight or assess a likelihood of the BFFAC signal 603 indicating the first-adjacent co-channel interference signals are significant, and providing a beam-forming output signal 617 in which weighting for noise-cancellation is provided for in response to the statistically-based analysis. The communications device further includes an interference-cancelling circuit 609 configured and arranged to reduce the first-adjacent co-channel interference signals by combining the beam-forming output signal 617 with the pre-processed RF output signals 607-1 and 607-2 as part of a MRC process and therein using the statistically-based analysis of the BFFAC signal to compensate for the first-adjacent co-channel interference.

As illustrated in FIG. 6, the likelihood of the BFFAC signal indicating the first-adjacent co-channel interference signals are significant may also be represented by sub-carrier metrics (e.g., as an alternative to or to supplement the approach discussed above in connection with FIG. 5). In such example embodiments, the interference-cancelling circuit 609 is configured and arranged to reduce the first-adjacent co-channel interference signals by performing a weighted-addition of the sub-carrier metrics, and performing a statistical analysis 611 such as LLR on the output signal from the MRC process. For instance, the interference-cancelling circuit 609 may perform the MRC process on each of the MRC signals 607-1, 607-2, and the BFFAC signal 617, based on sub-carrier metrics. The statistical analysis 611 may be applied to the combined signal responsive to application of the MRC process. The likelihood of the BFFAC signal 617 indicating the first-adjacent co-channel interference signals are significant may be represented by sub-carrier metrics, and the MRC process may be applied in a manner proportional to the sub-carrier metrics.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, and/or other circuit-type depictions (e.g., reference numerals 513-1, 513-2, 613-1, 613-2, 515, 615, 509, and 609 of FIGS. 5 and 6 depict a circuit as described herein). As a further example, reference to "device" includes or refers to circuitry such as communications circuits implemented as part of an RF transmitter, RF transceiver, RF receiver, an HDradio™ receiver, an HDradio™ transmitter, or communications systems/components more generally. Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches discussed and illustrated in connection with in FIGS. 5 and 6. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described and illustrated in connection with FIGS. 5 and 6 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the activities illustrated by FIGS. 5 and 6 can include additional and/or different processes, statistical analyses, and/or antennae than illustrated. Such modifications do not depart from the true spirit and scope of various aspects of the disclosure, including aspects set forth in the claims.

What is claimed is:

1. A communications device for improving reception of transmissions with first-adjacent co-channel interference signals corresponding to digitally-modulated side-bands of in-band on-channel (IBOC) broadcasted signals, the device comprising:
   a radio frequency (RF) signal-reception circuit including two RF-signal paths driven in response to signals received via at least two respective antennas and including respectively-associated front-end circuits including analog-to-digital converter and signal-processing circuitry configured to respond to signals carried in the respective RF-signal paths by providing pre-processed RF output signals;
   a beam-forming circuit driven in response to the signals received at the at least two respective antennas and configured and arranged in parallel with the two RF-signal paths of the RF signal-reception circuit to facilitate first-adjacent interference cancellation (FAC) by:
      providing a beam forming for first adjacent cancellation (BFFAC) signal as a function of the first-adjacent co-channel interference signals;
      using a statistically-based analysis to weight or assess a likelihood of the BFFAC signal indicating the first-adjacent co-channel interference signals are significant; and
      providing a beam-forming output signal in which weighting for noise-cancellation is provided for in response to the statistically-based analysis; and
   an interference-cancelling circuit configured and arranged to reduce the first-adjacent co-channel interference signals by combining the beam-forming output signal with the pre-processed RF output signals by using the statistically-based analysis of the BFFAC signal to compensate for the first-adjacent co-channel interference.

2. The communications device of claim 1, wherein the beam-forming circuit is configured and arranged to apply a log-likelihood ratio analysis to weight or assess the likelihood of the BFFAC signal indicating the first-adjacent co-channel interference signals are significant.

3. The communications device of claim 1, wherein the beam-forming circuit is configured and arranged to compare the likelihood of the BFFAC signal indicating the first-adjacent co-channel interference signals are significant to a pre-stored threshold level of first-adjacent co-channel interference.

4. The communications device of claim 1, wherein the beam-forming circuit is configured and arranged to compare the likelihood of the BFFAC signal indicating the first-adjacent co-channel interference signals are significant to a pre-stored threshold level of first-adjacent co-channel interference as part of a maximum ratio combining (MRC) process, and the interference cancelling circuit is configured and arranged to apply the MRC process responsive to a determination that the likelihood of the BFFAC signal indicating that the first-adjacent co-channel interference signals are less than the pre-stored threshold level of first-adjacent co-channel interference.

5. The communications device of claim 1, wherein the beam-forming circuit is configured and arranged to compare the likelihood of the BFFAC signal indicating the first-adjacent co-channel interference signals are significant to a pre-stored threshold level of first-adjacent co-channel interference, and the interference cancelling circuit is configured and arranged to apply a weighting process to the BFFAC signal based on the comparison.

6. The communications device of claim 1, wherein the likelihood of the BFFAC signal indicating the first-adjacent co-channel interference signals are significant is represented by bit metrics, and wherein the interference-cancelling circuit is configured and arranged to reduce the first-adjacent co-channel interference signals by performing a weighted-addition of the bit metrics.

7. The communications device of claim 1, wherein the likelihood of the BFFAC signal indicating the first-adjacent co-channel interference signals are significant is represented by sub-carrier metrics, and wherein the interference-cancelling circuit is configured and arranged to reduce the first-adjacent co-channel interference signals by performing a weighted-addition of the sub-carrier metrics.

8. A method for improving reception of transmissions with first-adjacent co-channel interference signals corresponding to digitally-modulated side-bands of in-band on-channel (IBOC) broadcasted signals, the method comprising:
generating at least two radio frequency (RF)-signal paths in response to signals received via at least two respective antennas;
providing pre-processed RF output signals for each of the at least two RF-signal paths using respectively-associated front-end circuits including analog-to-digital converter and signal-processing circuitry;
in response to the signals received at the at least two respective antennas, facilitating first-adjacent interference cancellation (FAC) by:
providing a beam forming for first adjacent cancellation (BFFAC) signal as a function of the first-adjacent co-channel interference signals;
using a statistically-based analysis to weigh or assess a likelihood of the BFFAC signal indicating the first-adjacent co-channel interference signals are significant; and
providing a beam-forming output signal in which weighting for noise-cancellation is provided for in response to the statistically-based analysis; and
reducing the first-adjacent co-channel interference signals by combining the beam-forming output signal with the pre-processed RF output signals using the statistically-based analysis of the BFFAC signal to compensate for the first-adjacent co-channel interference.

9. The method of claim 8, including combining the pre-processed RF output signals and the BFFAC signal responsive to application of the statistically-based analysis to each of the pre-processed RF output signals and the BFFAC signal, and applying a maximum ratio combining (MRC) process to the combined signals.

10. The method of claim 8, including combining the pre-processed RF output signals and the BFFAC signal, applying a maximum ratio combining (MRC) process to the combined signal, and applying the statistically-based analysis to the combined signal responsive to application of the MRC process.

11. The method of claim 10, wherein the likelihood of the BFFAC signal indicating the first-adjacent co-channel interference signals are significant is represented by bit metrics, and applying the MRC process to the combined signal includes performing a weighted-addition of the bit metrics.

12. The method of claim 8, wherein the likelihood of the BFFAC signal indicating the first-adjacent co-channel interference signals are significant is represented by sub-carrier metrics, as part of an maximum ratio combining (MRC) process, and wherein the MRC process is applied in a manner proportional to the sub-carrier metrics.

13. The method of claim 8, wherein providing pre-processed RF output signals includes applying a fast Fourier transform (FFT) process to each of the RF-signal paths, the method including applying the FFT process to the BFFAC signal prior to application of the MRC process.

14. The method of claim 8, including:
comparing the likelihood of the BFFAC signal indicating the first-adjacent co-channel interference signals are significant to a pre-stored threshold level of first-adjacent co-channel interference; and
applying a maximum ratio combining (MRC) process responsive to a determination that the likelihood of the BFFAC signal indicating that the first-adjacent co-channel interference signals are less than the pre-stored threshold level of first-adjacent co-channel interference.

15. The method of claim 8, including:
comparing the likelihood of the BFFAC signal indicating the first-adjacent co-channel interference signals are significant to a pre-stored threshold level of first-adjacent co-channel interference.

16. The method of claim 8, including comparing the likelihood of the BFFAC signal indicating the first-adjacent co-channel interference signals are significant to a pre-stored threshold level of first-adjacent co-channel interference, and applying a weighting process to the BFFAC signal based on the comparison.

17. The method of claim 8, wherein applying a weighted process includes applying the maximum ratio combining (MRC) process responsive to a determination that the likelihood of the BFFAC signal indicating that the first-adjacent co-channel interference signals are less than a pre-stored threshold level of first-adjacent co-channel interference.

18. The method of claim 8, wherein the signals are simultaneously received via the at least two respective antennas.

19. The method of claim 8, wherein using the statically-based analysis includes applying a log-likelihood ratio analysis to weigh or assess the likelihood of the BFFAC signal indicating the first-adjacent co-channel interference signals are significant.

* * * * *